(12) United States Patent
Kim et al.

(10) Patent No.: US 10,862,144 B2
(45) Date of Patent: Dec. 8, 2020

(54) HUMIDIFICATION DEVICE FOR FUEL CELL

(71) Applicants: HYUNDAI MOTOR COMPANY, Seoul (KR); KIA MOTORS CORPORATION, Seoul (KR)

(72) Inventors: Hyunyoo Kim, Seoul (KR); Sae Han Oh, Suwon-si (KR); Chang Ha Lee, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 158 days.

(21) Appl. No.: 16/179,228

(22) Filed: Nov. 2, 2018

(65) Prior Publication Data

US 2020/0052312 A1 Feb. 13, 2020

(30) Foreign Application Priority Data

Aug. 8, 2018 (KR) .................. 10-2018-0092207

(51) Int. Cl.
*H01M 8/04119* (2016.01)
*H01M 8/04746* (2016.01)
*H01M 8/04828* (2016.01)

(52) U.S. Cl.
CPC ... *H01M 8/04149* (2013.01); *H01M 8/04761* (2013.01); *H01M 8/04776* (2013.01); *H01M 8/04843* (2013.01)

(58) Field of Classification Search
CPC ......... H01M 8/04149; H01M 8/04776; H01M 8/04761; H01M 8/04843; H01M 2250/20; H01M 8/04835; B60L 50/70
See application file for complete search history.

(56) References Cited

U.S. PATENT DOCUMENTS

| | | | | |
|---|---|---|---|---|
| 2010/0323259 A1* | 12/2010 | Sung | .................. | H01M 8/04228 429/429 |
| 2012/0251900 A1* | 10/2012 | Sugawara | ......... | H01M 8/04089 429/413 |
| 2016/0036073 A1* | 2/2016 | Kim | .................. | H01M 8/04291 429/414 |

* cited by examiner

*Primary Examiner* — Muhammad S Siddiquee
(74) *Attorney, Agent, or Firm* — Brinks Gilson & Lione

(57) ABSTRACT

A humidifier for a fuel cell enables moisture exchange between supply air supplied from an air compressor and exhaust air discharged from the fuel cell. In particular, the humidifier of the fuel cell may include: i) a housing main body; ii) a humidification membrane module that is provided in the housing main body; and iii) a bypass unit that is provided in the housing main body to selectively bypass the supply air supplied from the air compressor and the exhaust air discharged from the fuel cell.

15 Claims, 10 Drawing Sheets

HUMIDIFICATION DEVICE FOR FUEL CELL

CROSS-REFERENCE TO RELATED APPLICATION

This application claims priority to and the benefit of Korean Patent Application No. 10-2018-0092207, filed on Aug. 8, 2018, the entire contents of which are incorporated herein by reference.

FIELD

An exemplary form of the present disclosure relates to a fuel cell system for a fuel cell vehicle. More particularly, the present disclosure relates to a humidification device for a fuel cell, which humidifies air supplied to the fuel cell.

BACKGROUND

The statements in this section merely provide background information related to the present disclosure and may not constitute prior art.

In general, a fuel cell system is a kind of electricity generation system that generates electrical energy from an electro-chemical reaction between hydrogen and air by a fuel cell. For example, the fuel cell system is used as a power source for driving an electric motor for a vehicle, a vessel, a train, an airplane, and the like.

The fuel cell system is provided with a stack, which is an assembly of fuel cells, each formed of an air electrode and a fuel electrode, an air supply system that supplies air to the air electrode of the fuel cell, a hydrogen supply system that supplies hydrogen to the fuel electrode of the fuel cell, and a water management device provided for controlling driving temperature and cooling of the stack.

The air supply system includes an air compressor and a humidifier. The air compressor takes in external air, compresses the external air, and supplies the compressed air to the air electrode of each fuel cell, and the humidifier humidifies air discharged from the air compressor to have an appropriate humidity and supplies the humidified air to the air electrode of each fuel cell.

Here, the humidifier humidifies air that is supplied from the air compressor by using moisture in exhaust air that is exhausted from the air electrode of the fuel cell, and supplies the humidified air to the air electrode of the fuel cell.

When the above-stated fuel cell system is employed in a fuel cell vehicle, the fuel cell system needs to adjust a humidification amount of the humidifier that supplies humidified air to the air electrode of the fuel cell depending on a driving condition of the vehicle. Since the degree of humidification of the humidifier affects performance and durability of the stack, it is important to adjust the humidification amount in the fuel cell system.

For example, when a humidification amount is insufficient, the stack is dried, thereby causing performance deterioration of the stack, and when a humidification amount is excessive, flooding occurs inside the stack, thereby causing a durability problem of the stack.

In a conventional art, a bypass flow path that bypasses supply air and exhaust air is provided outside a humidifier housing to adjust a humidification amount of the humidifier, and a bypass valve is provided in the bypass flow path.

However, in the conventional art, we have discovered that a bypass valve is individually provided for each of bypass flow paths of different routes that are connected with the humidifier housing, and thus unnecessary spaces may be included in a layout of the fuel cell system.

The above information disclosed in this Background section is only for enhancement of understanding of the background of the present disclosure and therefore it may contain information that does not form the prior art that is already known to a person of ordinary skill in the art.

SUMMARY

The present disclosure has been made in an effort to provide a humidifier for a fuel cell, which can implement bypass for exhaust air and supply air with a simple configuration according to a vehicle driving condition while maintaining humidification performance.

In one form of the present disclosure, a humidifier for a fuel cell, which enables moisture exchange between supply air supplied from an air compressor and exhaust air discharged from the fuel cell, includes: i) a housing main body; ii) a humidification membrane module that is provided in the housing main body; and iii) a bypass unit that is provided in the housing main body to selectively bypass the supply air supplied from the air compressor and the exhaust air discharged from the fuel cell.

The bypass unit includes: a bypass flow path portion that is provided in the housing main body, and forms a bypass flow path of the supply air and the exhaust air; and a valve body portion that is provided in the bypass flow portion, and selectively opens and closes the bypass flow path of the supply air and the exhaust air.

The valve body portion may be rotatably provided in the bypass flow path portion, and, as a single body, bypasses the supply air and the exhaust air in three directions through the bypass flow path.

The bypass flow path portion may partially protrude to the outside from the inside of the housing main body.

The valve body portion may be rotatably provided in the bypass flow path portion in the housing main body.

The valve body portion may be rotatably provided in the bypass flow path portion from the outside of the housing main body.

A humidifier for a fuel cell, which enables moisture exchange between supply air supplied from an air compressor and exhaust air discharged from the fuel cell according to another exemplary form of the present disclosure includes: a housing main body that includes a first cap portion having a supply air inlet portion, a second cap portion having a humidified air outlet portion, and a mid-housing having an exhaust air inlet portion and an exhaust air outlet portion and provided between the first cap portion and the second cap portion; a humidification membrane module that is provided inside the mid-housing and that connects the first cap portion and the second cap portion; a bypass flow path portion that is provided inside of the mid-housing and forms a first bypass path connecting the exhaust air inlet portion and the second cap portion, a second bypass path connecting the exhaust air outlet portion and the first cap portion, and a valve passage connecting the first bypass path and the second bypass path; and a valve body portion rotatably provided in the valve passage and including a plurality of valve holes, each valve hole formed in the shape of a cylinder of which opposite ends may be closed.

A valve driver may be provided in the second cap portion to rotate the valve body portion in a predetermined rotation angle range.

In addition, the valve body portion may penetrate the first and second bypass paths through the valve passage and is connected to the valve driver.

The valve body portion may include: a first valve hole that is provided in a portion where the first bypass path and the valve passage are connected, and is selectively connected with the first bypass path; and a pair of a second hole and a third hole that are arranged with a predetermined angle with respect to the first valve hole. In particular, the pair of the second hold and the third hole is provided in a portion where the second bypass path and the valve passage are connected, and is selectively connected with the second bypass path.

The second valve hole and the third valve hole may be formed at intervals of about 60 degrees with reference of the first valve hole.

The valve body portion may close the first bypass path and the second bypass path, respectively, at a predetermined reference location.

The valve body portion may rotate at a predetermined angle, connect the first bypass path and the second bypass path through the first valve hole and the second valve hole, respectively, and connect the first cap portion and the second cap portion.

The valve body portion may rotate at a predetermined angle, connect the first bypass path and the second bypass path through the first valve hole and the third valve hole, and connect the exhaust air inlet portion and the exhaust air outlet portion.

The valve body portion may rotate at a predetermined angle, and connect the first cap portion of the second bypass path and the exhaust air outlet portion through the second valve hole and the third valve hole.

In addition, the humidification membrane module may be fixed to opposite sides of the mid-housing through a potting layer.

The humidification membrane module may form a shell-side as an exhaust air flow path at the periphery of hollow fiber membranes in the mid-housing.

One end of the first bypass path may be fixed to the potting layer.

A first protrusion portion that protrudes outside the mid-housing may be formed at the other end of the first bypass path.

The first protrusion portion may be connected with the exhaust air inlet portion.

One end of the second bypass path may be fixed to the potting layer.

A second protrusion portion that protrudes outside the mid-housing may be formed at the other end of the second bypass path.

The second protrusion portion may be connected with the exhaust air outlet portion.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
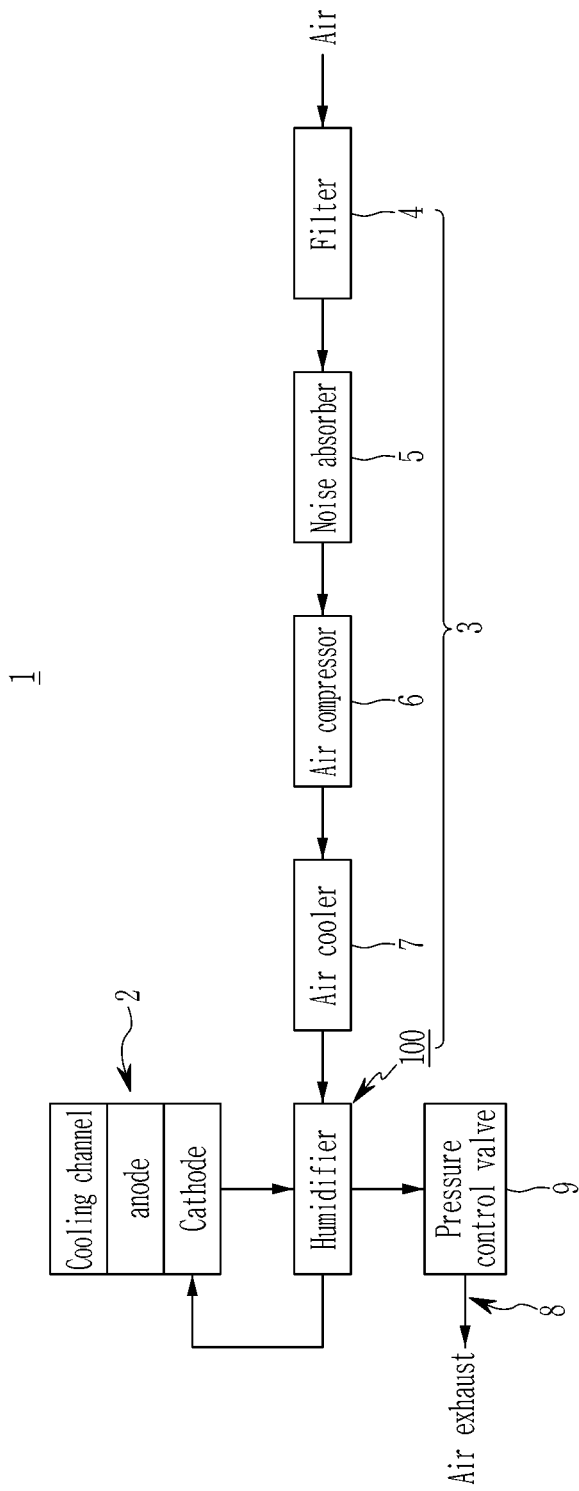
FIG. 1 is a schematic block diagram of a fuel cell system to which an exemplary form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

FIG. 1 is a schematic block diagram of an example of a fuel cell system to which an exemplary form of the present disclosure is applied.

Referring to FIG. 1, a fuel cell system 1 to which the exemplary form of the present disclosure is applied is a kind of electricity generation system that generates electrical energy from an electro-chemical reaction between hydrogen and air. The fuel cell system 1 may be provided in a fuel cell vehicle that is driven by an electric motor using the above electrical energy.

The fuel cell system 1 includes: a fuel cell stack 2 that includes a fuel electrode, an air electrode, and a cooling channel, and an air supply system 3 that supplies air to the fuel cell stack 2.

The fuel cell stack 2 receives hydrogen at the fuel electrode and receives oxygen at the air electrode, and generates electrical energy from an electro-chemical reaction between hydrogen and oxygen.

The air supply system 3 includes a filter 4 that filters impurities in external air, a sound absorber 5 that suppresses air intake noise, an air compressor 6 that takes in and compresses air, and an air cooler 7 that cools air discharged from the air compressor 6.

Since the filter 4, the noise absorber 5, the air compressor 6, and the air cooler 7 provided in the air supply system 3 are known in the art to which the present disclosure pertains, a detailed description thereof will be omitted.

In addition, the air supply system 3 further includes a humidifier 100 that humidifies air from the air cooler 7 and supplies the humidified air to an air electrode of the fuel cell stack 2.

The humidifier 100 humidifies supply air through moisture exchange between moisture-contained exhaust air discharged from the air electrode of the fuel cell stack 2 and supply air supplied from the air compressor 6, and supplies the humidified supply air to the air electrode of the fuel cell stack.

Further, the fuel cell system 1 includes an exhaust system 8 for discharging air from the humidifier 100 to the air.

The fuel cell system 1 may further include a pressure control valve 9 that varies an air flow cross-section of an air flow path through which air is discharged to the outside, and controls a pressure of the fuel cell stack 2.

When such a fuel cell system 1 is applied to a fuel cell vehicle, the fuel cell system 1 needs to adjust an amount of humidification of the humidifier according to a driving condition of the vehicle.

For example, when the vehicle is being driven, a flow amount of air supplied to the fuel cell stack 2 is increased and thus a humidification amount of the humidifier 100 needs to be increased, which is a normal condition. Hereinafter, such a normal condition will be referred to as a first condition.

When the vehicle is starting, stopping, or idling, the flow amount of air supplied to the fuel cell stack 2 is reduced, and thus the humidification amount of the humidifier 100 needs to be reduced. Such a condition will be referred to as a second condition.

In addition, in order to satisfy regulation of hydrogen concentration in air discharged through the exhaust system 8, air discharged from the air compressor 6 needs to be supplied to the exhaust system 8 to dilute the hydrogen concentration in the discharged air. Further, when the vehicle runs on a long steel plate, the air compressor 6 is utilized as an energy consumer for consuming regenerative energy. Hereinafter, such a hydrogen concentration dilution condition and regenerative energy consumption condition will be referred to as a third condition.

The first to third conditions can be determined by power consumed by the air compressor 6. In addition, the first to third conditions may be determined by measurement of a flow amount and pressure of the fuel cell system 1. Further, the first to third conditions may be determined by predetermined control logic of a controller according to sense signals of various sensors that sense a driving condition of a fuel cell vehicle.

In the exemplary form of the present disclosure, the first condition, the second condition, and the third condition of the fuel cell system 1 can be clearly determined depending on a driving condition of the vehicle, and therefore the above-stated first to third conditions will not be limited to specific numerical ranges.

Meanwhile, in the first condition, air discharged from the fuel cell stack 2 and air discharged from the air compressor 6 both can be supplied to the humidifier 100.

In addition, in the second condition, a part of air supplied from the air compressor 6 may be bypassed to a humidified air outlet side of the humidifier 100, or a part of exhaust air discharged from the fuel cell stack 2 may be bypassed to an exhaust air outlet side of the humidifier 100.

In addition, in the third condition, a part of supply air supplied from the air compressor 6 may be bypassed to the exhaust air outlet side of the humidifier 100.

In one form, the humidifier 100 has a structure that can realize bypass of exhaust air and supply air with a simple configuration according to a driving condition of the vehicle while maintaining humidification performance.

Figure 2:
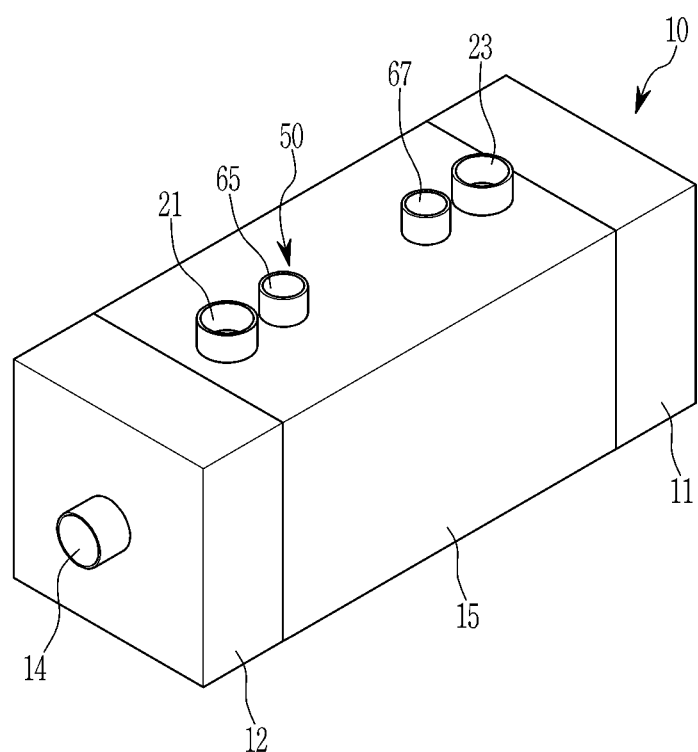
FIG. 2 is a combined perspective view of a humidifier for a fuel cell according to the exemplary form of the present disclosure.
Figure 3:
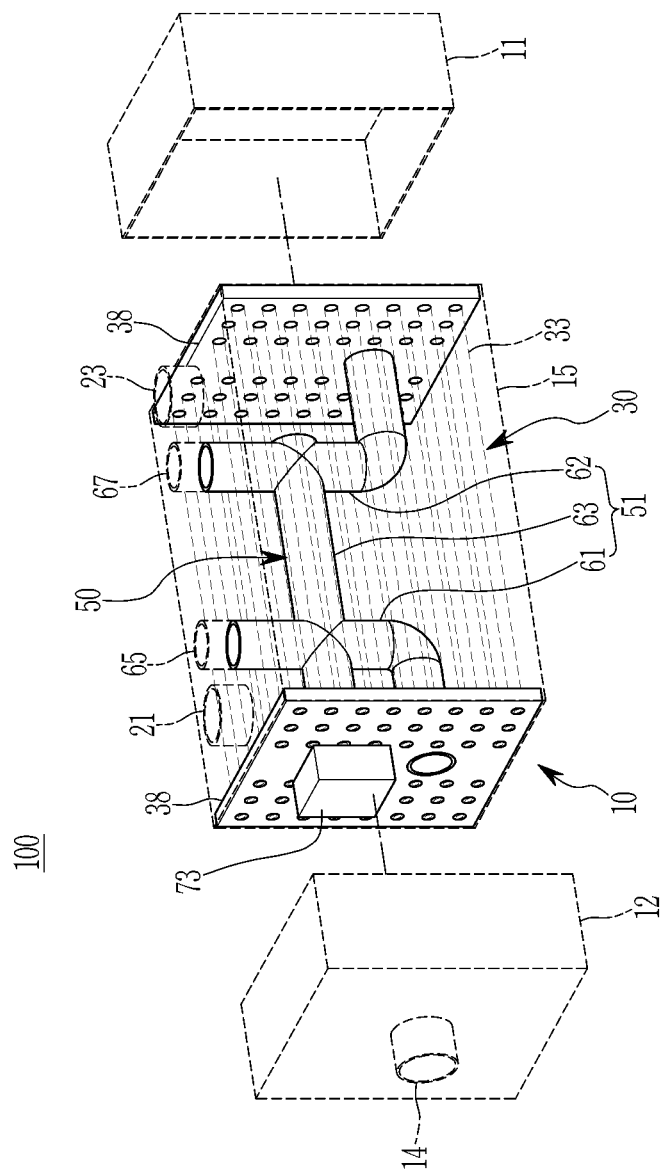
FIG. 3 is an exploded perspective view of the fuel cell humidifier according to the exemplary form of the present disclosure.
Figure 4:
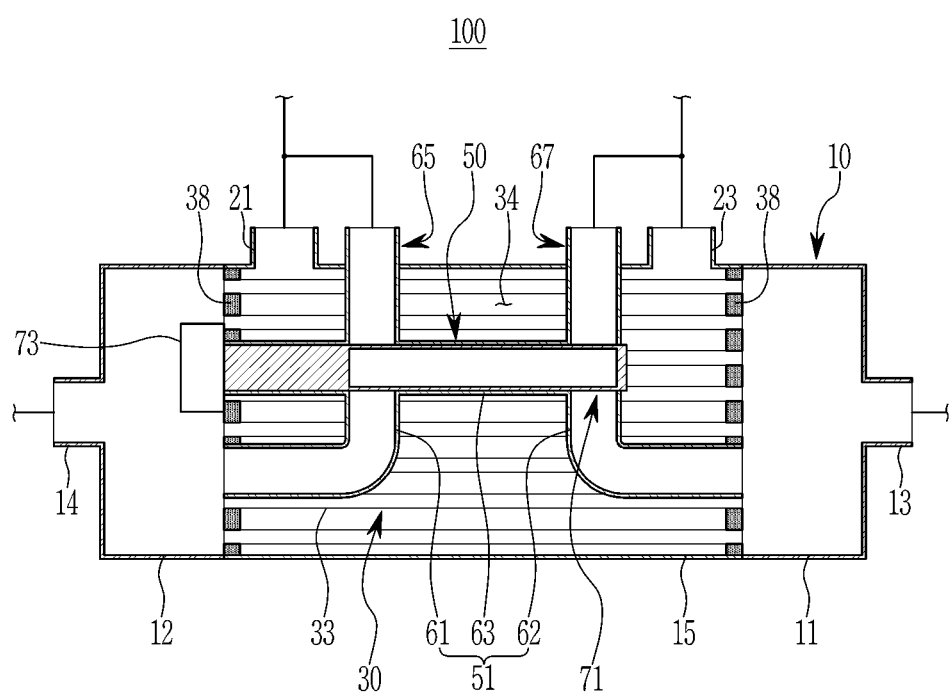
FIG. 4 is a cross-sectional view of an assembly of the fuel cell humidifier according to the exemplary form of the present disclosure.

FIG. 2 is a combined perspective view of the humidifier for the fuel cell according to the exemplary form of the present disclosure, FIG. 3 is an exploded perspective view of FIG. 2, and FIG. 4 is a combined cross-sectional view of FIG. 2.

Referring to FIG. 2 to FIG. 4, the humidifier 100 basically includes a housing main body 10, a humidification membrane 30, and a bypass unit 50, and each of these elements will be described hereinafter.

In the exemplary form of the present disclosure, the housing main body 10 is a housing of the humidifier 100, and includes a first cap portion 11, a second cap portion 12, and a mid-housing 15.

The first cap portion 11 is also called a cap-in or a tube-in, and is provided to inject air supplied through the air compressor 6 (hereinafter referring to FIG. 1) into the humidification membrane module 30. The humidification membrane module 30 will be described in detail later.

The first cap portion 11 is combined to one end of the mid-housing 15, which will be described in detail later. The first cap portion 11 forms a supply air inlet portion 13 for introduction of the supply air to the humidification membrane module 30. Here, an air cooler (not shown) may be provided in the first cap portion 11 to cool the supply air.

The second cap portion 12 is also called a cap-out or a tube-out in the art, and the second cap portion 12 is provided to discharge humidified air introduced from the humidification membrane module 30 to a cathode of the fuel cell stack 2.

The second cap portion 12 is combined to the other end of the mid-housing 15. The second cap portion 12 forms a humidified air outlet portion 14 for discharging humidified air to the fuel cell stack 2.

In addition, the mid-housing 15 is also called a shell in the art, and opposite sides thereof are opened and provided between the first cap portion 11 and the second cap portion 12. For example, the mid-housing 15 may have a quadrangular-shaped cross-section as shown in the drawing, or may have a circular-shaped cross-section (not shown in the drawing).

The mid-housing 15 forms an exhaust air inlet portion 21 through which exhaust air discharged from the fuel cell stack 2 (hereinafter referring to FIG. 2) is introduced, and an exhaust air outlet portion 23 through which exhaust air that is subjected or not subjected to humidification of supply air is discharged to the outside.

In the exemplary form of the present disclosure, the humidification membrane module 30 generates humidified air through moisture exchange between supply air supplied to the supply air inlet portion 13 of the first cap portion 11 from the air compressor 6 and exhaust air discharged from the fuel cell stack 2.

The humidification membrane module 30 provides membrane humidification of the supply air and the exhaust air, and supplies the humidified air to the cathode of the fuel cell stack 2 through the humidified air outlet portion 14 of the second cap portion 12.

The humidification membrane module 30 is provided in the mid-housing 15 in the housing main body 10. The humidification membrane module 30 includes a plurality of hollow fiber membranes 33. The hollow fiber membranes 33 are where membrane humidification of the supply air and the exhaust air is substantially carried out, and they are embedded in the form of a bundle in the mid-housing 15 and connect the first cap portion 11 and the second cap portion 12.

For example, the hollow fiber membranes 33 are packaged in bundles by a mesh network (not shown), and may be inserted in the mid-housing 15. The mesh network provides uniform distribution of the exhaust air in the mid-housing 15, and prevents the hollow fiber membranes 33 from being damaged when the hollow fiber membranes 33 are inserted into the mid-housing 15.

The above-described humidification membrane module 30 is fixed to opposite sides of the mid-housing 15 through a potting layer 38. The potting layer 38 is formed of a polymer material, and closes opposite open ends of the mid-housing 15.

The potting layer 38 fixes a bypass unit 50 disposed inside the mid-housing 15, and supports opposite ends of each of the hollow fiber membranes 33. The bypass unit 50 will be described later in detail. The hollow fiber membranes 33 connect the inside of the first cap portion 11 and the inside the second cap portion 12 while being supported by the potting layer 38.

In addition, a shell-side 34, which functions as an exhaust air flow path, is formed at the periphery of the hollow fiber membranes 33 in the mid-housing 15. Such a shell-side 34 is connected with the above-stated exhaust air inlet portion 21 and exhaust air outlet portion 23.

In the exemplary form of the present disclosure, the bypass unit 50 is provided to bypass supply air and exhaust air supplied to the mid-housing 15. The bypass unit 50 is provided in the housing main body 10.

Here, the bypass unit 50 can bypass a part of supply air supplied to the mid-housing 15 through the supply air inlet portion 13 of the first cap portion 11 from the air compressor 6 to the humidified air outlet portion 14 of the second cap portion 12.

In addition, the bypass unit 50 can bypass a part of exhaust air supplied to the mid-housing 15 through the exhaust air inlet portion 21 from the fuel cell stack 2 to the exhaust air outlet portion 23.

Further, the bypass unit 50 can bypass a part of supply air supplied to the mid-housing 15 through the supply air inlet portion 13 of the first cap portion 11 from the air compressor 6 to the exhaust air outlet portion 23.

The bypass unit 50 includes a bypass flow path portion 51 provided in the mid-housing 15 in the housing main body 10, and a valve body portion 71 provided in the bypass flow path portion 51.

The bypass flow path portion 51 forms a bypass flow path of the above-stated supply air and exhaust air, and the valve body portion 71 selectively opens and closes the bypass flow path of the supply air and the exhaust air.

The bypass flow path portion 51 partially protrudes to the outside in the housing main body 10, that is, in the mid-housing 15. As a single body, the valve body portion 71 is rotatably provided in the bypass flow path portion 51 to bypass the supply air and the exhaust air to three directions through the bypass flow path. In addition, the valve body portion 71 is rotatably provided in the bypass flow path portion 51 in the mid-housing 15.

Hereinafter, a bypass flow path structure of the bypass flow path portion 51, a combination structure of the valve body portion 71 with respect to the bypass flow path portion 51, and a bypass implementation structure will be described in detail.

In the exemplary form of the present disclosure, the bypass flow path portion 51 includes a first bypass path 61 and a second bypass path 62 as the bypass flow path, and a valve passage 63 that connects the first bypass path 61 and the second bypass path 62.

The first bypass path 61 is provided in the shape of a pipe that connects the exhaust air inlet portion 21 and the second cap portion 12 in the mid-housing 15. One end of the first bypass path 61 is fixed to the potting layer 38, and is connected to the inside of the second cap portion 12.

A first protrusion portion 65 that protrudes to the outside of the mid-housing 15 is formed in the other end of the first bypass path 61. The first protrusion portion 65 is connected with the exhaust air inlet portion 21 of the mid-housing 15, and may be connected with a connection line that connects the exhaust air inlet portion 21 and an air outlet side of the fuel cell stack 2 through an additional branch line.

The second bypass path 62 is provided in the shape of a pipe that connects the exhaust air outlet portion 23 and the first cap portion 11 of the mid-housing 15. One end of the second bypass path 62 is fixed to the potting layer 38, and is connected with the inside of the first cap portion 11.

A second protrusion portion 67 that protrudes to the outside of the mid-housing 15 is formed in the other end of the second bypass path 62. The second protrusion portion 67 is connected with the exhaust air outlet portion 23 of the mid-housing 15, and may be connected with a connection line that connects the exhaust air outlet portion 23 and the exhaust system 8 through an additional branch line.

The valve body portion 71, which will be described in further detail later, is provided in the valve passage 63, and the valve passage 63 connects the first and second bypass paths 61 and 62. The valve passage 63 is provided in the shape of a pipe, and is connected to a center portion of the first and second bypass paths 61 and 62.

In the exemplary form of the present disclosure, the valve body portion 71 is provided in the shape of a cylinder having closed opposite ends, and includes valve holes 81, 82, and 83 that selectively connect the first and second bypass paths 61 and 62 of the bypass flow path portion 51.

The valve body portion 71 is rotatably provided in the valve passage 63 through a valve driver 73. The valve driver 73 may include, as an actuator for rotating the valve body portion 71, a servo motor that is known in the art and enables servo control in, for example, rotation speed and direction.

Such a valve driver 73 can rotate the valve body portion 71 within a predetermined rotation angle range depending on the above-described driving conditions (i.e., the first to third conditions) of the vehicle. Here, the valve body portion 71 penetrates the first and second bypass paths 61 and 62 through the valve passage 63, and is connected to a driving shaft of the valve driver 73.

Figure 5:
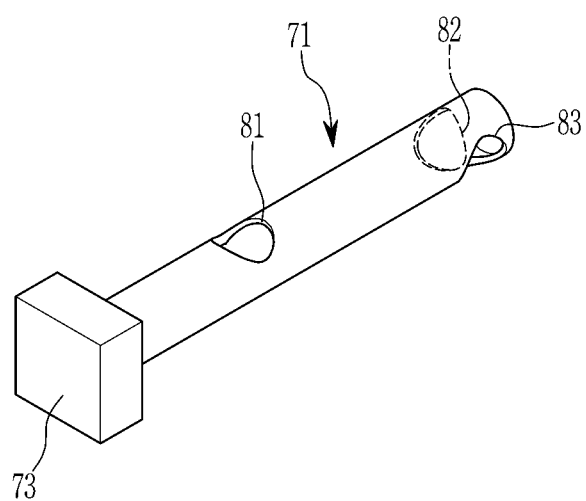
FIG. 5 is a perspective view of a valve body portion applied to the fuel cell humidifier according to the exemplary form of the present disclosure.

The valve holes 81, 82, and 83, as shown in FIG. 5, will now be called a first valve hole 81, a second valve hole 82, and a third valve hole 82, respectively.

The first valve hole 81 is formed in a portion where the first bypass path 61 and the valve passage 63 are connected, and is selectively connected with the first bypass path 61. In addition, the second valve hole 82 and the third valve hole 83 are formed in a portion where the second bypass path 62 and the valve passage 63 are connected.

The above-stated second and third valve holes 82 and 83 are provided while having a predetermined angle with reference to the first valve hole 81, and are selectively connected with the second bypass path 62. For example, the second hole 82 and the third hole 83 are formed at intervals of 60 degrees with respect to the first valve 81.

Here, the valve body portion 71 may close the first bypass path 61 and the second bypass path 62, respectively, at a predetermined reference location (e.g., a reference location of the above-described first condition).

In addition, the valve body portion 71 rotates at a predetermined angle at the reference location, and connects the first and second bypass paths 61 and 72 through the first and second valve holes 81 and 82, and connects the first cap portion 11 and the second cap portion 12.

In addition, the valve body portion 71 rotates at a predetermined angle at the reference location, and connects the first and second bypass paths 61 and 62 through the first and third valve holes 81 and 83, and connects the exhaust air inlet portion 21 and the exhaust air outlet portion 23.

Further, the valve body portion 71 rotates at a predetermined angle at the reference location, and connects the first cap portion 11 of the second bypass path 62 and the exhaust air outlet portion 23 through the second and third valve holes 82 and 83.

Hereinafter, operations and effects of the above-described humidifier 100 of the fuel cell battery according to the exemplary form of the present disclosure will be described in detail with reference to the above-disclosed drawings and the accompanying drawings.

FIG. 6 to FIG. 9 are provided for explanation of operation of the humidifier of the fuel cell battery according to the exemplary form of the present disclosure.

Figure 6:
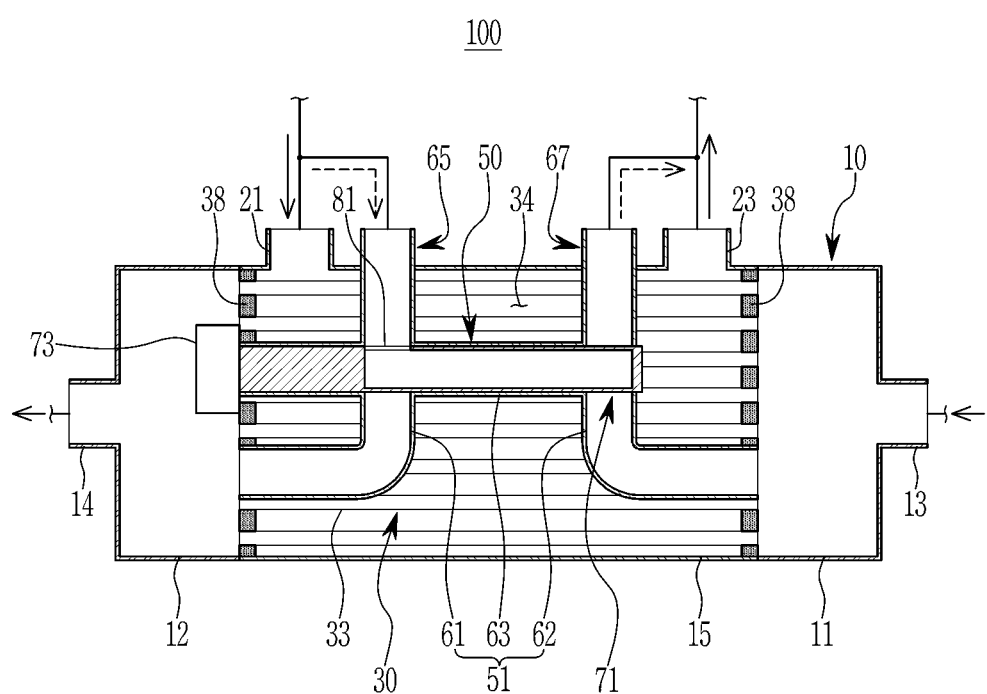
FIG. 6 to FIG. 9 are views illustrating the operation of the fuel cell humidifier according to the exemplary form of the present disclosure.

Referring to FIG. 6, the valve body portion 71 is placed at a predetermined reference location under the first condition of the driving condition of the vehicle. In this case, the first to third valve holes 81, 82, and 83 of the valve body portion 71 may all be closed, or as shown in the drawing, only the first hole 81 may be opened. Thus, the valve body portion 71 closes the first and second bypass paths 61 and 62, respectively.

In such a case, supply air supplied from the air compressor 6 is introduced into the first cap portion 11 through the supply air inlet portion 13, and flows to the second cap portion 12 through the hollow fiber membranes 33 of the humidification membrane module 30 in the first cap portion 11.

Simultaneously, exhaust air discharged from the fuel cell stack 2 is introduced into the mid-housing 15 through the exhaust air inlet portion 21 of the mid-housing 15. Thus, the exhaust air flows to the shell-side 34 at the periphery of the hollow fiber membranes 33 in the mid-housing 15.

Thus, in the exemplary form of the present disclosure, humidification of supply air can be carried out through moisture exchange between supply air that flows to the second cap portion 12 through the hollow fiber membranes 33 in the first cap portion 11 and exhaust air flowing through the shell-side 34. The humidified air is introduced into the second cap portion 12 and discharged through the humidified air outlet portion 14, and is then supplied to the cathode of the fuel cell stack 2.

In the above-described process, exhaust air that is subjected to humidification of the supply air, and discharged air, which is exhaust air that is not subjected to humidification, are discharged through the exhaust air output portion 23 in the mid-housing 15, and then emitted to the exhaust system 8.

Since the valve body portion 81 closes the first and second bypass paths 61 and 62 in the first condition, the supply air and the exhaust air cannot be bypassed through the first and second bypass paths 61 and 62.

Figure 7:
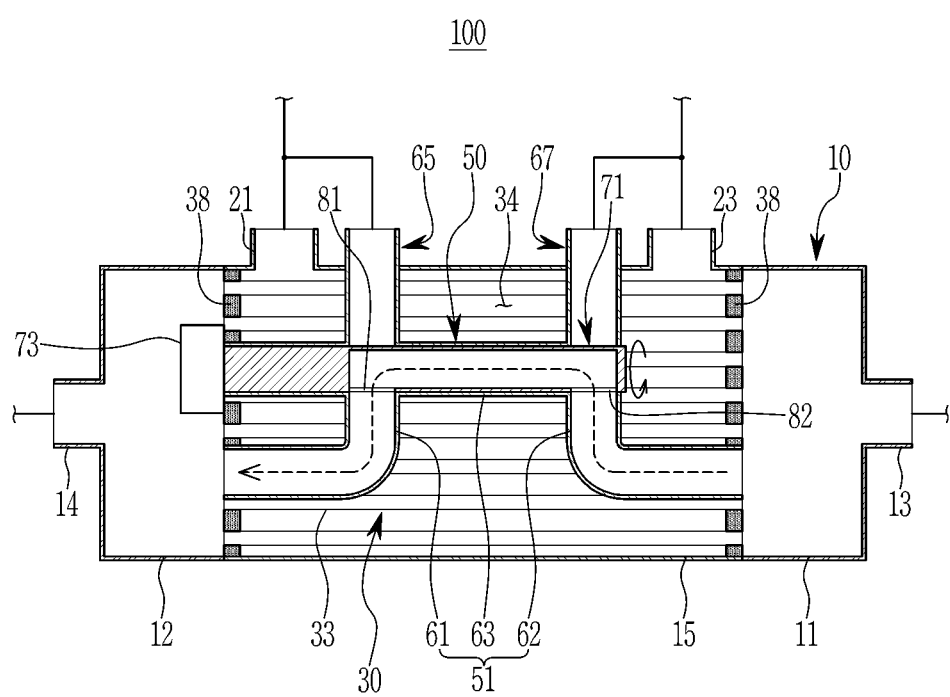

Referring to FIG. 7, in the exemplary form of the present disclosure, the valve body portion 71 is rotated at a predetermined angle (e.g., 150 degrees) through the valve driver 73 in the second condition of the vehicle driving condition with reference to the above-stated first condition.

Then, in the exemplary form of the present disclosure, the first bypass path 61 and the second bypass path 62 are connected with each other through the first valve hole 81 and the second valve hole 82 of the valve body portion 71, and the first cap portion 11 and the second cap portion 12 may be connected with each other through the first bypass path 61 and the second bypass path 62.

Thus, in the exemplary form of the present disclosure, a part of the supply air supplied to the mid-housing 15 through the supply air inlet portion 13 of the first cap portion 11 from the air compressor 6 can be bypassed to the humidified air outlet portion 14 of the second cap portion 12 through the bypass flow path of the first and second bypass paths 61 and 62.

Figure 8:
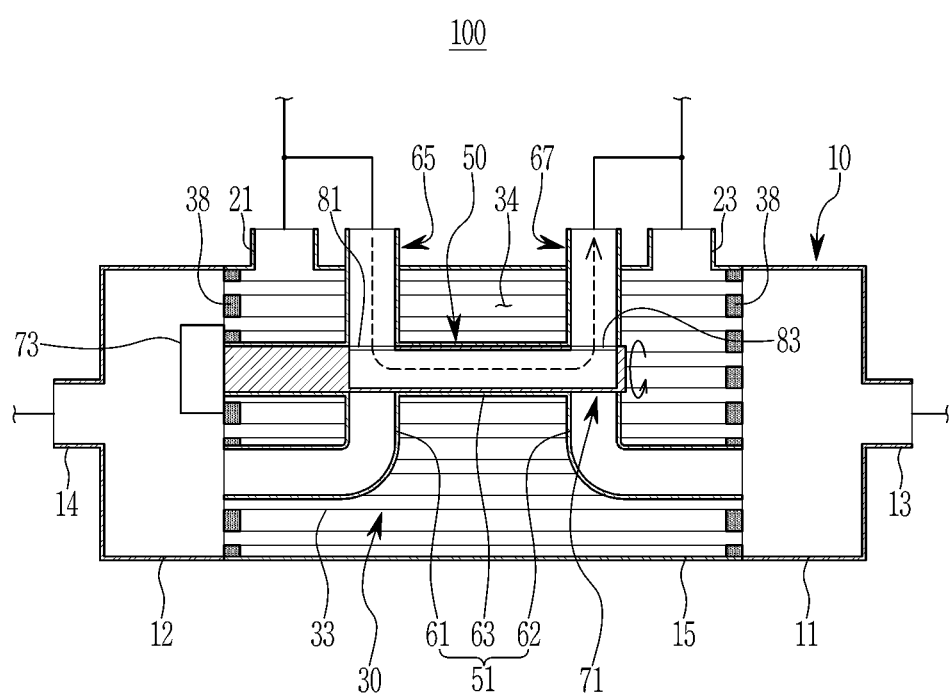

In addition, referring to FIG. 8, in the second condition of the driving condition of the vehicle according to the exemplary form of the present disclosure, the valve body portion 71 rotates at a predetermined angle (e.g., 30 degrees) through the valve driver 73 with reference to the above-described first condition.

Then, in the exemplary form of the present disclosure, the first bypass path 61 and the second bypass path 62 are connected with each other through the first and third holes 81 and 83 of the valve body portion 71, respectively, and the exhaust air inlet portion 21 and the exhaust air outlet portion 23 can be connected with each other through the first and second bypass paths 61 and 62.

Accordingly, in one form of the present disclosure, a part of the exhaust air supplied into the mid-housing 15 through the exhaust air inlet portion 21 from the fuel cell stack 2 can be bypassed to the exhaust air outlet portion 23 through the bypass flow path of the first and second bypass paths 61 and 62.

Figure 9:
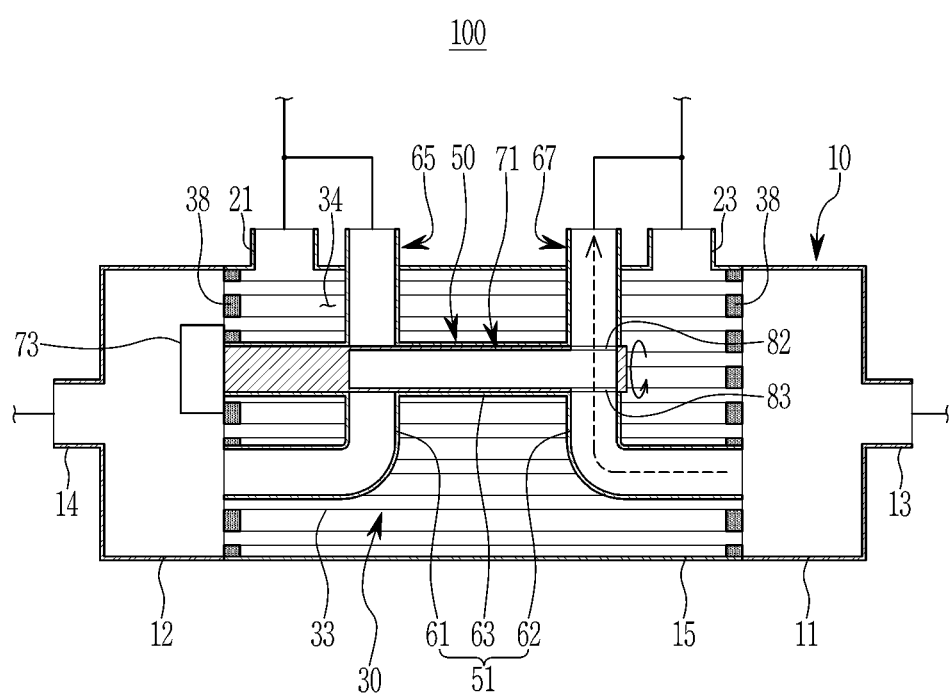

Meanwhile, referring to FIG. 9, in the third condition of the driving condition of the vehicle in the exemplary form of the present disclosure, the valve body portion 71 is rotated at a predetermined angle (e.g., 90 degrees) through the valve driver 73 with reference to the above-described first condition.

Then, in the exemplary form of the present disclosure, the first cap portion 11 of the second bypass path 62 and the exhaust air outlet portion 23 can be connected with each other through the second and third valve holes 82 and 83 of the valve body portion 71.

Thus, a part of the supply air supplied to the mid-housing 15 through the supply air inlet portion 13 of the first cap portion 11 from the air compressor 6 can be bypassed to the exhaust air outlet portion 23 through the second bypass path 62.

The above-described fuel cell humidifier 100 according to the exemplary form of the present disclosure enables the bypass unit 50 to be integrally provided inside the housing body 10, thereby realizing bypassing of exhaust air and supply air according to a vehicle driving condition.

That is, the supply air and the exhaust air can be selectively bypassed according to a vehicle driving condition, and an amount of humidification of air supplied to the fuel cell stack 2 can be adjusted. In addition, in one form of the present disclosure, the supply air can be selectively bypassed according to a vehicle driving condition and hydrogen concentration in air discharged through the exhaust system 8 can be reduced, and the air compressor 6 may be utilized as an energy consumption device for consuming regenerative energy.

Accordingly, in the exemplary form of the present disclosure, an unnecessary space in a layout of the fuel cell system 1 can be reduced while maintain humidification performance of the humidifier 100 through integration of the bypass unit 50 to the humidifier 100, and accordingly, the entire layout of the fuel cell system 1 can be compactly implemented.

Figure 10:
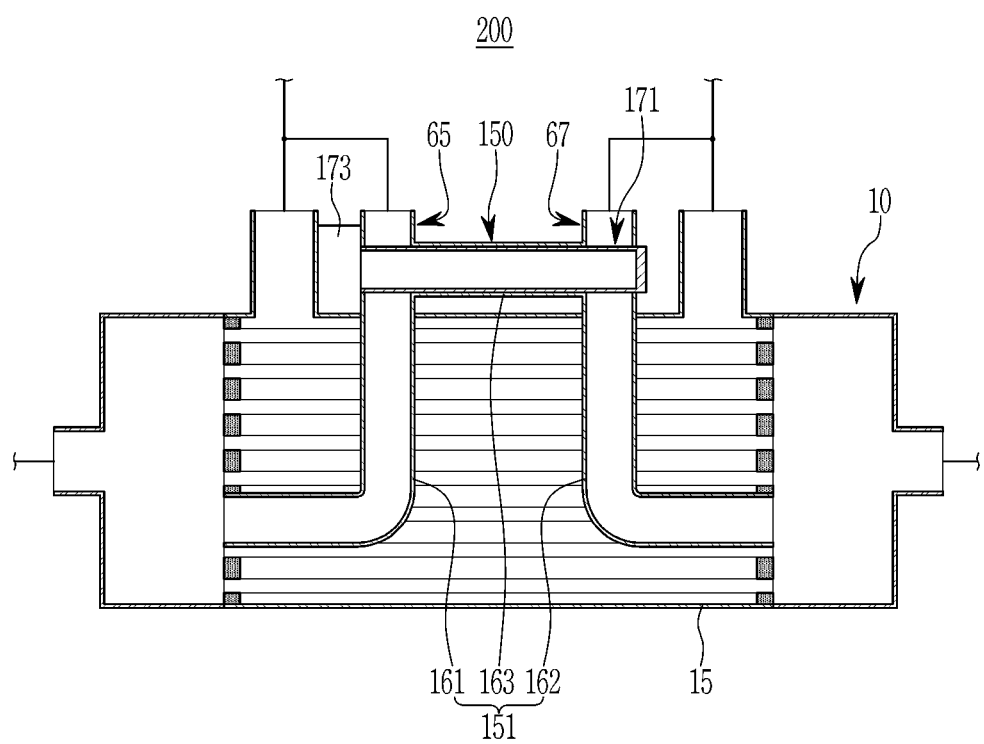
FIG. 10 is a view schematically showing a fuel cell humidifier according to another exemplary form of the present disclosure.

FIG. 10 schematically shows a fuel cell humidifier according to another exemplary form of the present disclosure. In the drawing, the same reference numerals are assigned to the same components as in the previous form.

Referring to FIG. 10, a humidifier 200 for a fuel cell according to another exemplary form of the present disclosure is based on the configuration of the previous form, and may include a bypass unit 150 where a valve body portion 171 is rotatably provided in a bypass flow path portion 151 from the outside of a housing main body 10.

In the present exemplary form, the bypass flow path portion 151 includes a first bypass path 161 and a second bypass path 162 as in the previous exemplary form. However, a valve passage 163 of the bypass flow path portion 151 connects a first protrusion portion 65 and a second protrusion portion 67 of the first bypass path 161 and the second bypass path 162 from outside the mid-housing 15.

In the present exemplary form, the valve body portion 171 is based on the configuration of the previous exemplary form, and is rotatably provided in the valve passage 163 at the outside of the mid-housing 15.

Here, a valve driver 173 that drives the valve body portion 171 to be rotated is fixed to the mid-housing 15 from outside the mid-housing 15, and is connected with the valve body portion 171.

Other configurations, operations, and/or effects of the humidifier 200 for the fuel cell according to the present exemplary form are the same as those in the previous exemplary form, and thus a detailed description thereof will be omitted.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

What is claimed is:

1. A humidifier of a fuel cell for, exchanging a moisture between a supply air supplied from an air compressor and an exhaust air discharged from the fuel cell, the humidifier comprising:
   a housing main body;
   a humidification membrane module provided in the housing main body; and
   a bypass unit provided in the housing main body and configured to selectively bypass the supply air supplied from the air compressor and the exhaust air discharged from the fuel cell,
   wherein the bypass unit comprises:
      a bypass flow path portion provided in the housing main body, and configured to: form a bypass flow path of the supply air and the exhaust air, and partially protrude to an outside from an inside of the housing main body; and
      a valve body portion rotatably provided in the bypass flow path portion, and configured to selectively open and close the bypass flow path of the supply air and the exhaust air.

2. The humidifier of claim 1, wherein the valve body portion is formed in a single body configured to bypass the supply air and the exhaust air in three directions through the bypass flow path.

3. The humidifier of claim 1, wherein the valve body portion is rotatably provided in the bypass flow path portion from the outside of the housing main body.

4. A humidifier of a fuel cell for exchanging a moisture between a supply air supplied from an air compressor and an exhaust air discharged from the fuel cell, the humidifier comprising:
   a housing main body including:
      a first cap portion having a supply air inlet portion,
      a second cap portion having a humidified air outlet portion, and
      a mid-housing having an exhaust air inlet portion and an exhaust air outlet portion and provided between the first cap portion and the second cap portion;
   a humidification membrane module provided inside of the mid-housing and configured to connect the first cap portion and the second cap portion;
   a bypass flow path portion provided inside of the mid-housing, and configured to form a first bypass path fluidly connecting the exhaust air inlet portion and the second cap portion, a second bypass path fluidly connecting the exhaust air outlet portion and the first cap portion, and a valve passage fluidly connecting the first bypass path and the second bypass path; and
   a valve body portion having a cylinder shape, rotatably provided in the valve passage and including a plurality of valve holes between both ends thereof,
   wherein the both ends of the valve body portion are closed.

5. The humidifier of claim 4, wherein a valve driver is provided in the second cap portion and configured to rotate the valve body portion in a predetermined rotation angle range, and the valve body portion penetrates the first and second bypass paths through the valve passage and is connected to the valve driver.

6. The humidifier of claim 4, wherein
   a first valve hole of the plurality of valve holes is provided in a portion where the first bypass path and the valve passage are connected, and is selectively connected with the first bypass path, and
   a second valve hole and a third valve hole of the plurality of valve holes are arranged with a predetermined angle with respect to the first valve hole, and
   wherein the second valve hole and the third valve hole of the plurality of valve holes are provided in a portion where the second bypass path and the valve passage are connected, and are selectively connected with the second bypass path.

7. The humidifier of claim 6, wherein the second valve hole and the third valve hole of the plurality of valve holes are formed at intervals of about 60 degrees with respect to the first valve hole.

8. The humidifier of claim 6, wherein the valve body portion closes the first bypass path and the second bypass path, respectively, at a predetermined reference location.

9. The humidifier of claim 6, wherein the valve body portion rotates at a predetermined angle, connects the first bypass path and the second bypass path through the first valve hole and the second valve hole of the plurality of valve holes, respectively, and connects the first cap portion and the second cap portion.

10. The humidifier of claim 6, wherein the valve body portion rotates at a predetermined angle, connects the first bypass path and the second bypass path through the first valve hole and the third valve hole of the plurality of valve holes, and connects the exhaust air inlet portion and the exhaust air outlet portion.

11. The humidifier of claim 6, wherein the valve body portion rotates at a predetermined angle, and connects the first cap portion of the second bypass path and the exhaust air outlet portion through the second valve hole and the third valve hole of the plurality of valve holes.

12. The humidifier of claim 4, wherein the humidification membrane module is fixed to opposite sides of the mid-housing through a potting layer.

13. The humidifier of claim 12, wherein the humidification membrane module forms a shell-side as an exhaust air flow path at a periphery of hollow fiber membranes in the mid-housing.

14. The humidifier of claim 12, wherein one end of the first bypass path is fixed to the potting layer,
   a first protrusion portion that protrudes outside of the mid-housing is formed at another end of the first bypass path, and
   the first protrusion portion is connected with the exhaust air inlet portion.

15. The humidifier of claim 14, wherein one end of the second bypass path is fixed to the potting layer,
   a second protrusion portion that protrudes outside of the mid-housing is formed at another end of the second bypass path, and
   the second protrusion portion is connected with the exhaust air outlet portion.

* * * * *